(12) United States Patent
Porter

(10) Patent No.: US 11,325,052 B2
(45) Date of Patent: May 10, 2022

(54) INTERLOCKING BLOCK WALL MOUNT

(71) Applicant: Michael Porter, Frisco, TX (US)

(72) Inventor: Michael Porter, Frisco, TX (US)

( * ) Notice: Subject to any disclaimer, the term of this patent is extended or adjusted under 35 U.S.C. 154(b) by 109 days.

(21) Appl. No.: 16/806,900

(22) Filed: Mar. 2, 2020

(65) Prior Publication Data
US 2021/0268396 A1 Sep. 2, 2021

(51) Int. Cl.
*F16M 11/00* (2006.01)
*A63H 33/08* (2006.01)
*F16M 13/02* (2006.01)

(52) U.S. Cl.
CPC ........... *A63H 33/086* (2013.01); *F16M 13/02* (2013.01)

(58) Field of Classification Search
CPC ....... A63H 33/086; F16M 13/02; F16M 13/00
See application file for complete search history.

(56) References Cited

U.S. PATENT DOCUMENTS

| 3,346,775 | A | * | 10/1967 | Christiansen | A63H 33/042 361/738 |
| 3,862,512 | A | * | 1/1975 | Vogel | A63H 33/086 446/128 |
| 5,098,328 | A | * | 3/1992 | Beerens | A63H 33/086 446/125 |
| 5,683,283 | A | * | 11/1997 | Glynn | A63H 33/086 446/128 |
| 5,964,635 | A | * | 10/1999 | Krog | A63H 33/101 446/116 |
| 6,679,780 | B1 | * | 1/2004 | Shih | A63F 9/1204 273/156 |
| 8,403,723 | B1 | * | 3/2013 | Haner | A63H 23/005 446/120 |
| 8,524,076 | B2 | * | 9/2013 | Yang | A63H 33/086 210/150 |
| D741,414 | S | * | 10/2015 | Lu | A63F 9/1204 D21/499 |
| 9,308,464 | B1 | * | 4/2016 | Torres | A63H 33/044 |
| 2006/0048475 | A1 | * | 3/2006 | Lin | A63H 33/088 52/589.1 |
| 2017/0015464 | A1 | * | 1/2017 | Ochi | B65D 21/0231 |
| 2018/0256997 | A1 | * | 9/2018 | Barwald | A63H 33/08 |
| 2019/0054389 | A1 | * | 2/2019 | Davis | A63H 33/086 |
| 2020/0179819 | A1 | * | 6/2020 | Vucinovic | A63H 33/06 |

* cited by examiner

*Primary Examiner* — Amy J. Sterling

(74) *Attorney, Agent, or Firm* — Braxton Perrone, PLLC; Gregory Perrone; Bobby W. Braxton

(57) ABSTRACT

An interlocking toy block display mount with a plurality of sides with multiple sides having mail interlocking members or female interlocking members disposed thereon. A plurality of bore holes pass through top, side and end sides of the mount along three axes and intersecting at the substantial center of the mount with a fastener inserted through one of the bore holes to secure the mount to a surface.

22 Claims, 5 Drawing Sheets

INTERLOCKING BLOCK WALL MOUNT

TECHNICAL FIELD

This disclosure relates generally to the field of display devices to accommodate interlocking toy block figures. It is particularly related to a wall mounted block having male and female interlocking members for receiving corresponding interlocking members on an interlocking toy block figure for securely mounting and displaying the interlocking toy block figure.

BACKGROUND

Interlocking toy blocks that have "male" and "female" components that mate to provide a strong connection have been enjoyed for many years. Those who create figures that are desired to be displayed have the problem of how to display such figures in a cost effective and efficient and unobtrusive manner Regular display cases or shelves are not effective because items for display can move, fall or break and display cases can be costly. What is needed is a portable, easy to install and remove, inexpensive device to securely display interlocking toy block creations.

SUMMARY OF THE INVENTION

This invention is directed to an interlocking block wall mount configured to receive a "male" or "female" member of an interlocking block creation for display to securely fasten block creation to a wall or other surface for display. The interlocking block wall mount has the appearance of the interlocking blocks used in the creation itself to provide seamless display and give the appearance that the creation is suspended in air. The interlocking block wall mount includes bore holes along three axes for mounting in multiple configurations and positions and permitting display of interlocking toy block creations in various directions and manners. The interlocking block wall mount has male and female connection members on at least one side for receiving corresponding female and male connection members on the interlocking toy block creation. One or more interlocking block wall mount units can be installed or combined to mount and display securely one or many interlocking toy block creations. Bore holes along three axes and corresponding hole caps permit attractive mounting and several configurations and ease in combining mounting units.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings and photographs, wherein:

DETAILED DESCRIPTION OF THE EMBODIMENTS

The detailed description set forth below is intended as a description of the present embodiments of the invention and is not intended to represent the only form in which the present invention may be constructed or utilized. The description sets forth the functions and sequences of steps for constructing and operating the invention. It is to be understood, however, that the same or equivalent functions and sequences may be accomplished by different embodiments and that they are also intended to be encompassed within the scope of the invention.

Several embodiments of Applicant's invention will now be described with reference to the drawings. Unless otherwise noted, like elements will be identified by identical numbers throughout all figures. The invention illustratively disclosed herein suitably may be practiced in the absence of any element which is not specifically disclosed herein.

Figure 1:
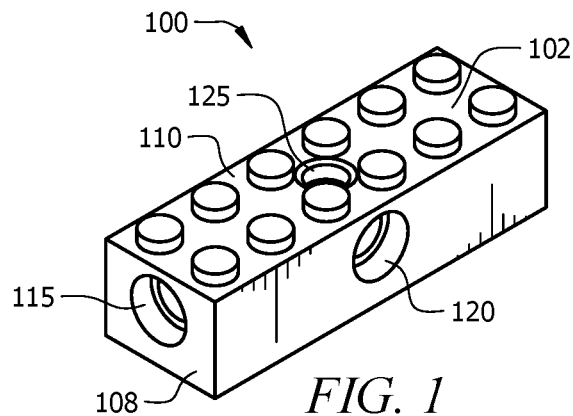
FIG. 1 depicts a perspective view including the top of the presently described interlocking block wall mount according to an embodiment of the present invention.
Figure 2:
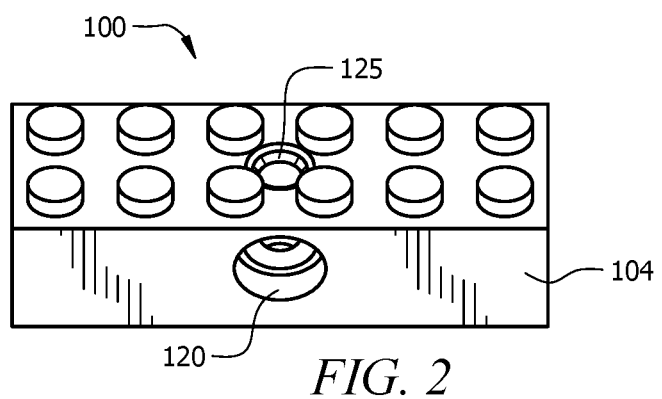
FIG. 2 depicts a perspective view including the side of the presently described interlocking block wall mount according to an embodiment of the present invention.

FIG. 1 depicts a perspective view including the top of the presently described interlocking block wall mount according to an embodiment of the present invention. Interlocking block wall mount 100 is shown, having a rectangular configuration. The interlocking block wall mount 100 in one embodiment includes a top side 102 having a number of male oriented interlocking members 110. These male oriented interlocking members are sized in terms of width and height to be received by a correspondingly sized in terms of width and depth female oriented interlocking member. Male and female interlocking members can be round, oval, rectangular or the like as long as each member is of the same shape. As shown further in FIG. 2, top side 102 includes top bore hole 125 that passes entirely through interlocking block wall mount 100 along the y-axis. Also, shown in FIG. 2 in first side 104 is a side bore hole 120 that passes through interlocking block wall mount 100 along the x-axis. Also in FIG. 1 is first end 108 having end bore hole 115 that extended through interlocking block wall mount 100 along the z-axis. These bore holes 115, 120 and 125 form a three direction arrangement of tunnels or tubes within interlocking block wall mount 100 that meet at the center point of interlocking block wall mount 100. In other embodiments, the holes in the top side 102 or first side 104 or first end 115 may be offset in any manner according to a particular application of use of interlocking block wall mount 100.

Figure 3:
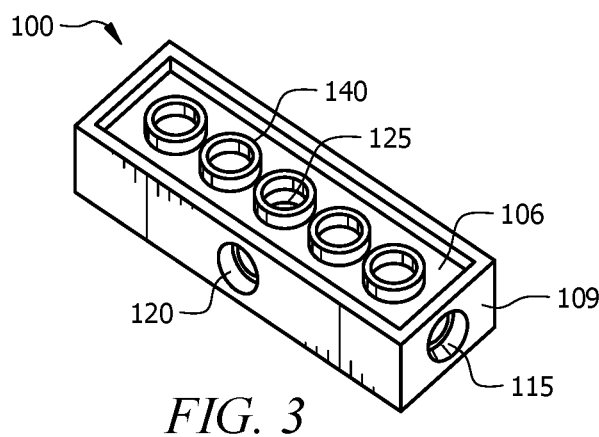
FIG. 3 depicts a perspective view including the bottom of the presently described interlocking block wall mount according to an embodiment of the present invention.

FIG. 3 depicts a perspective view including the bottom of the presently described interlocking block wall mount according to an embodiment of the present invention. In FIG. 3 shows a bottom side 106 of interlocking block wall mount 100. Bottom side 106 includes a series of female oriented interlocking members 140 that are sized in terms of width and depth to receive a correspondingly sized in terms of width and height male oriented interlocking member 110 is shown. Bottom side 106 includes the bottom end of top bore hole 125 that passes through to top side 102 along the y-axis of interlocking block wall mount 110. The top side 102 and bottom side 106 of interlocking block wall mount 110 includes at least one male 110 and one female 140 oriented interlocking members, depending on the size of interlocking block wall mount 110.

In one embodiment, interlocking block wall mount 100 is mounted on a flat surface, such as a wall, by passing a screw, nail or peg through one of bore holes 115, 120 or 125 to secure interlocking block wall mount 100 to the wall. The bore hole used to secure interlocking block wall mount 100 to the wall depends on the configuration desired by the user.

Figure 4:
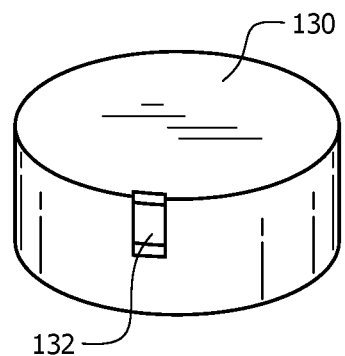
FIG. 4 depicts a perspective view of a bore hole cap according to an embodiment of the present invention.

FIG. 4 depicts an embodiment of hole cap 130 that is inserted into bore holes 115, 120 and 125 for hiding the bore holes for more aesthetically pleasing use. Hole cap 130 is sized to snugly fit into bore hole 115, 120 and 125. Hole caps 130 can include one or more notches 132 that can extend to the edge of hole cap 130 for ease of removal of hole cap 130 from a bore hole. Use of a small item such as the tip of a pen or one's fingernail inserted into notch 132 enables removal of hole cap 130 from a bore hole.

Figure 5A:
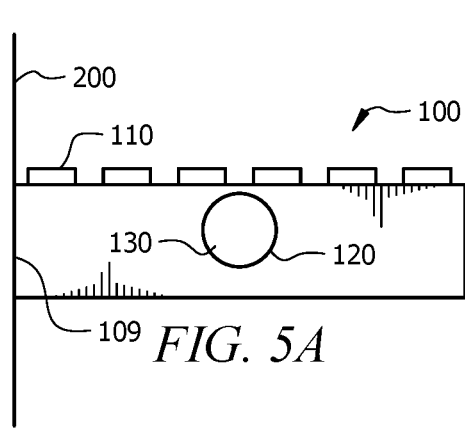
FIG. 5A depicts a side view of a mounted interlocking block wall mount according to an embodiment of the present invention.
Figure 5B:
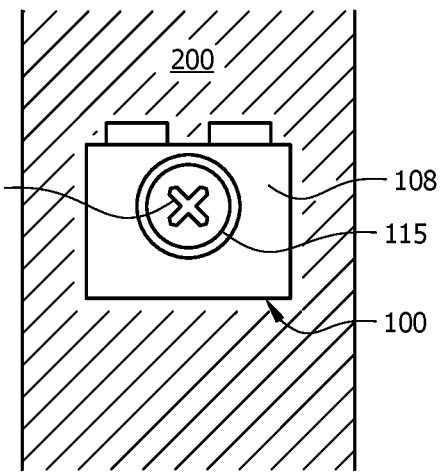
FIG. 5B depicts a front view of a mounted interlocking block wall mount according to an embodiment of the present invention.

FIGS. 5A and 5B depict interlocking block wall mount 100 configured with an end of interlocking block wall mount 100 abutting the wall. As shown, second end 109 of interlocking block wall mount 100 abuts wall 200. In this arrangement, bore hole 115, which passes through first end 108 and second end 109 of interlocking block wall mount 100 receives an appropriate fastener such as a nail, screw, peg or the like. In this side view first side 104 is shown having side bore hole 120 that is not in use and capped with hole cap 130. The end of a flat head screw 150 is shown in FIG. 5B, which is a front view of interlocking block wall mount 100 mounted to wall 200. When installed in this manner interlocking block wall mount 100 acts as a shelf of having male interlocking members 110 and female interlocking members 140 to receive corresponding interlocking members of an object for display for secure mounting.

Figure 6:
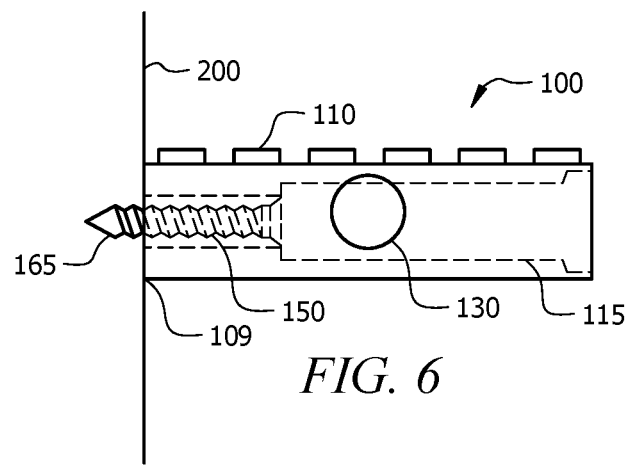
FIG. 6 depicts a side view of a mounted interlocking block wall mount according to an embodiment of the present invention.

FIG. 6 provides a more detailed side view of interlocking block wall mount 100 installed with second end 109 abutting wall 200. In FIG. 6, interlocking block wall mount 100 has flat head screw 150 that passes through end bore hole 115. Flat head screw 150 is optionally received by anchor 165 which is embedded into wall 200. In the alternative, flat head screw 150 is screwed into a joist behind wall 200 or directly into the wall material, such as drywall, plaster, brick, etc. In another embodiment, a nail, peg or other suitable fastener can be inserted through end bore hole 115 to secure interlocking block wall mount 100 to a wall or desired mounting surface. As shown in FIG. 5, male interlocking members 110 extend from top side 102 for receiving corresponding female interlocking members of an object to be displayed. Also as shown in FIG. 6, hole cap 130 is placed over side bore hole 120 to cover the hole to make interlocking block wall mount 100 more visually pleasing.

Figure 7:
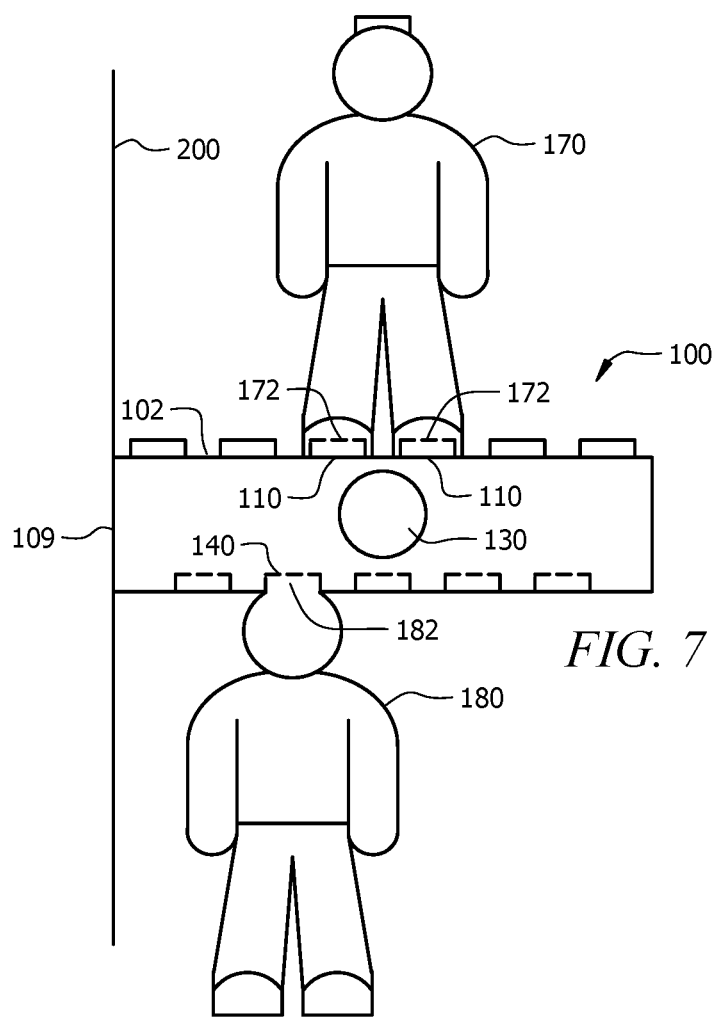
FIG. 7 depicts a side view of a mounted interlocking block wall mount on which figures are installed according to an embodiment of the present invention.

FIG. 7 depicts a side view of interlocking block wall mount 100 having displayed objects mounted thereon. In FIG. 7, interlocking block wall mount 100 is installed as previously discussed against wall 200 with second end side 109 abutting wall 200. A first interlocking block FIG. 170 is installed for display on top side 102. Male interlocking members 110 are received by corresponding object female interlocking members 172, in this case within the feet of block FIG. 170, which loosely resembles a person. Similarly, on bottom side 106 a second interlocking block FIG. 180 is installed for display. Here second interlocking block FIG. 180 includes object male member 182 that corresponds to female interlocking member 140 within bottom side 106 of interlocking block wall mount 100. The size and shape of object male member 182 corresponds to the size and shape of female interlocking member 140 so as to form a tight and snug fit sufficient to securely allow second interlocking block FIG. 180 to effectively hang from bottom side 106 of interlocking block wall mount 100. Any arrangement of interlocking block figures or items can be displayed depending on the surface area and male and female interlocking members 110 and 140 available to receive a figure or item for display.

Figure 8:
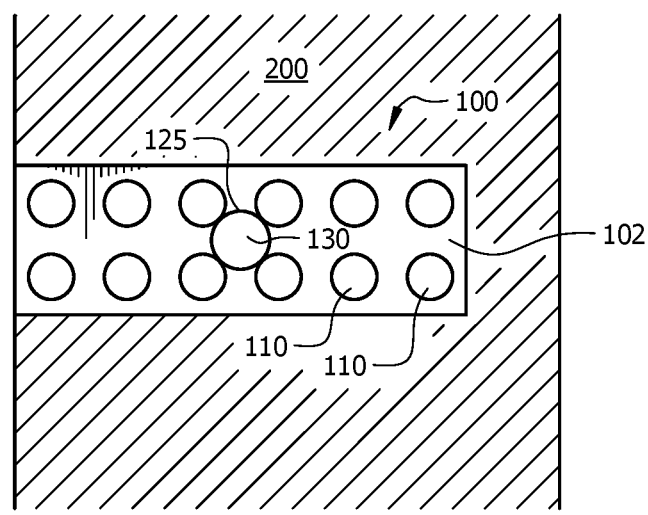
FIG. 8 depicts a front view of a mounted interlocking block wall mount according to an embodiment of the present invention.

FIG. 8 depicts interlocking block wall mount 100 mounted with top side 102 facing forward. In other words, interlocking block wall mount 100 is rotated ninety degrees counter-clockwise from the installation shown in FIG. 7, but with bottom side 106 mounted to wall 200. In this arrangement, top side bore hole 125 is covered with hole cap 130 with male interlocking members 110 facings forward. In this arrangement, figures for display can extend from the front of interlocking block wall mount 100.

In the embodiments shown, male interlocking members 110 are found on one side of interlocking block wall mount 100. In another embodiment, male or female interlocking members can be located on any and all sides of interlocking block wall mount 100, including both male and female interlocking members 110 and 140 arranged on the same side of interlocking block wall mount 100. In this manner, any number of figures can be displayed from as many as five sides of interlocking block wall mount 100.

Figure 9A:
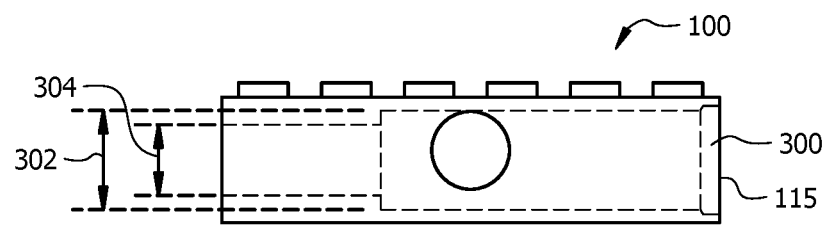
FIG. 9A depicts a side view of an embodiment of the present invention.
Figure 9B:
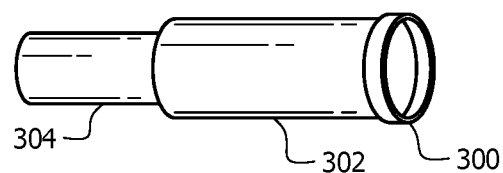
FIG. 9B depicts a perspective view of a bore hole insert according to an embodiment of the present invention.

FIG. 9B depicts bore hole insert 300 according to an embodiment of the present invention. Bore hole insert 300 is sized to effectively reduce the diameter of the various bore holes for effective mounting. In some applications the fasteners available to the user may vary or the surface on which interlocking block wall mount 100 is to be mounted requires a fastener of small diameter. As such, bore hole insert 300 in inserted into bore hole to reduce the diameter of the bore hole used for mounting according to the size of available fastener. Multiple bore hole inserts having various diameters can be provided as a mounting kit, with bore hole inserts having smaller diameters 302, 304 inserted into those with larger diameters to provide a snug mount. As shown in FIG. 9A, inserts 300, 302 and 304 can be nested to provide a range of diameters for the receiving bore hole. In other embodiments a bore hole insert having a slightly larger diameter than the fastener can be used to allow interlocking block wall mount 100 to spin or rotate after installation to add to the entertainment of the user. As shown in FIG. 9A, a first bore hole insert 300 is inserted into end bore hole 115 of interlocking block wall mount 100 and a second bore hole insert 302 having a smaller diameter is inserted into the first bore hole insert 300. As will be described, as seen in FIG. 11B, the various inserts create a stepped profile corresponding to the variously sized bore hole inserts, with lips 502 and 504 resulting from the stepped arrangement. Lips 502 and 504 serve to prevent over-insertion of fasteners, such as a screw as previously described by providing a stop.

Figure 10A:
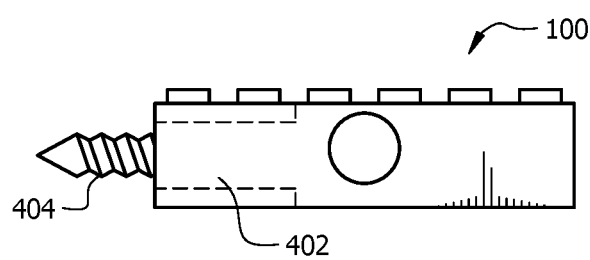
FIG. 10A depicts a side view of an interlocking block wall mount mounted with a fastener according to an embodiment of the present invention.
Figure 10B:
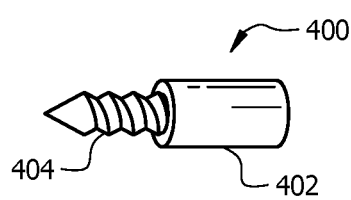
FIG. 10B depicts a side view of an embodiment of a fastener for use with an interlocking block wall mount according to an embodiment of the present invention

FIG. 10B depicts a custom fastener according to an embodiment of the invention. Hybrid fastener 400 includes a peg portion 402 and screw portion 404. Peg portion 402 has a diameter substantially equal to the diameter of the various bore holes. In addition, peg portion 402 has a length to accommodate any of the three bore holes. Alternative, peg portion 402 can be sized to specifically accommodate the length of the end bore hole, top bore hole and side bore hole. This specific sizing offers greater stability in mounting. The screw portion 404 of hybrid fastener 400 is the lower half of a screw. In other embodiments, the lower or fastener portion can be a nail. As shown, hybrid fastener 400 is inserted into end bore hole 115 of interlocking block wall mount 100. Screw portion 404 extends from the end of interlocking block wall mount 100 for insertion into the wall while the length of end bore hole 115 is occupied by peg portion 402. Hybrid fastener 400 provides another option for installation. FIG. 10A depicts a side view of interlocking block wall mount 100. The profile of peg portion 402 of hybrid fastener within an installed interlocking block wall mount 100 is shown by the dashed lines.

As shown in the various embodiments, bore holes 115, 120 and 125 are round and cylindrical in shape. In other embodiments, bore holes 115, 120 and 125 can be oval, rectangular or other shaped partial or whole cylinders that can accommodate an appropriate fastener. The hole caps can be similarly shaped to accommodate the shape of the bore hole. Peg portion 402 of hybrid fastener 400 can be shaped in this manner to correspond to the shape of the various bore holes. Bore hole inserts 300, 302 and 304 can also be shaped according to the shape of the various bore holes.

Figure 11A:
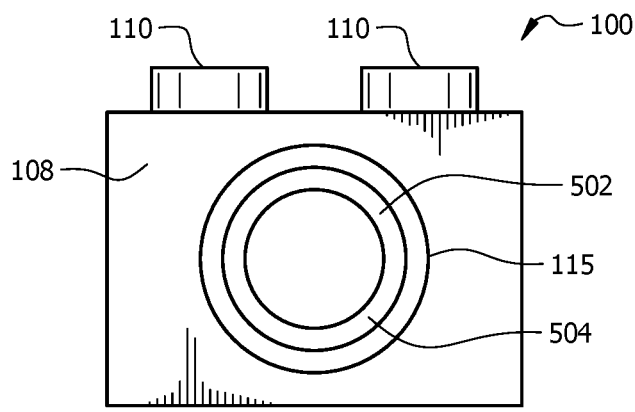
FIG. 11A depicts a front view of an interlocking block wall mount according to an embodiment of the present invention.
Figure 11B:
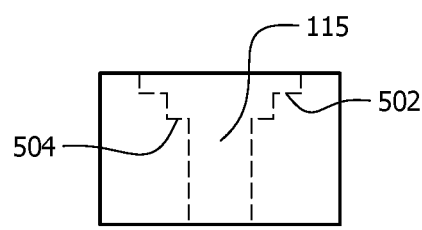
FIG. 11B depicts a view of a bore hole of an interlocking block wall mount according to an embodiment of the present invention.

As previously discussed, FIG. 11A depicts an expanded view of a bore hole according to an embodiment of the present invention. As shown in FIG. 11A, interlocking block wall mount 100 includes end side 108 in which end bore hole 115 is disposed. The opening of bore hole 115 is constructed in a step arrangement where each step of lip serves as a stopper. A first lip 502 and a second lip 504 are concentric rings in a step configuration extending inward into bore hole 115 according to the outer circumference of bore hole 115 at the surface of end side 108. A first lip 502 in direct contact with the opening of bore hole 115 serves as a stopper for hole caps 130, preventing the hole cap from being inserted too far into bore hole 115 so as to prevent removal. The opening resulting from first lip 502 has a smaller diameter than the outermost opening of bore hole 115. A second lip 504 extends inward from first lip 502 and serves as a stopper of a screw head 150 (FIG. 5B) in order to prevent over-insertion of a screw or other fastener into bore hole 115. The opening resulting from second lip 504 has a smaller diameter than the innermost opening of first lip 502.

Side bore holes 120 and top bore hole 125 can be configured in the same manner, having multiple lips in a step arrangement. The profile of first lip 502 and second lip 504 of bore hold 115 are also shown in FIG. 11B, with each lip disposed on the outer end of each bore hole as shown.

Figure 12:
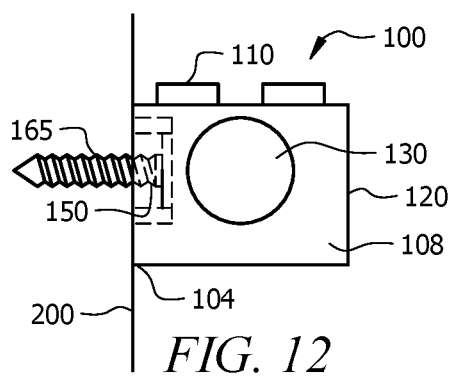
FIG. 12 depicts a side view of an interlocking block wall mount mounted with a fastener according to an embodiment of the present invention.

FIG. 12 depicts a side view of an installed interlocking block wall mount 100. As shown, side 104 abuts wall 200. Fastener, such as screw 150 is installed within bore hole 120, and received by anchor 165.

In the various embodiments, interlocking block wall mount 100 is a rectangular cube. Interlocking block wall mount 100 can in other embodiments be triangular, trapezoidal, cylindrical, round, irregular, or of any desired shape. Interlocking block wall mount 100 can be made of plastic, made from resin, metal, wood or the like.

While the disclosed embodiments have been described with reference to one or more particular implementations, these implementations are not intended to limit or restrict the scope or applicability of the invention. Those having ordinary skill in the art will recognize that many modifications and alterations to the disclosed embodiments are available. Therefore, each of the foregoing embodiments and obvious variants thereof is contemplated as falling within the spirit and scope of the disclosed inventions.

While the invention has been particularly shown and described with reference to a preferred embodiment, it will be understood by those skilled in the art that various changes in form and detail can be made therein without departing from the spirit and scope of the invention.

I claim:

1. An interlocking block mounting apparatus, comprising:
   an interlockable block having a plurality of sides;
   at least one male interlocking member disposed on at least one of the plurality of sides;
   at least one female interlocking member disposed on at least one of the plurality of sides;
   a first bore hole extending throughout the length of the interlocking block along a first axis and disposed on a first of the plurality of sides;
   a second bore hole extending throughout the length of the interlocking block along a second axis and disposed on a second of the plurality of sides;
   a third bore hole extending throughout the length of the interlocking block along a third axis and disposed on a third of the plurality of sides; and
   a peg sized according to the length and diameter of at least one of the first, second and third bore holes,
   wherein the at least one male interlocking member is sized to receive a corresponding object female interlocking member of an object for display,
   wherein the at least one female interlocking member is sized to receive a corresponding object male interlocking member of the object for display.

2. The interlocking block mounting apparatus of claim 1, wherein the first bore hole, the second bore hole and the third bore hole intersect at the substantial center of the interlockable block.

3. The interlocking block mounting apparatus of claim 1, further comprising a cap corresponding to an opening of one of the first bore hole, the second bore hole and the third bore hole.

4. The interlocking block mounting apparatus of claim 1, wherein the interlockable block is a rectangular cube.

5. The interlocking block mounting apparatus of claim 1, wherein the first side, the second side and the third side are constructed of plastic.

6. The interlocking block mounting apparatus of claim 1, further comprising a fastener end disposed at an end of the peg.

7. The interlocking block mounting apparatus of claim 1, wherein the bore hole is sized according to one of a round cylinder, an oval cylinder, a rectangular cylinder, and an irregularly shaped cylinder.

8. The interlocking block mounting apparatus of claim 1, wherein the at least one male interlocking member and the at least one female interlocking are disposed on one of the plurality of sides.

9. The interlocking block mounting apparatus of claim 1, wherein the at least one male interlocking member is disposed on a first of the plurality of sides and the at least one female interlocking is disposed on a second of the plurality of sides.

10. The interlocking block mounting apparatus of claim 1, wherein the at least one male interlocking member and the at least one female interlocking are disposed on the plurality of sides.

11. The interlocking block mounting apparatus of claim 1, further comprising a bore hole insert having a diameter smaller than a diameter of at least one of the first bore hole, the second bore hole and the third bore hole.

12. An interlocking block mounting apparatus, comprising:
    an interlockable block having a plurality of sides;
    at least one male interlocking member disposed on at least one of the plurality of sides;
    at least one female interlocking member disposed on at least one of the plurality of sides;
    a first bore hole extending throughout the length of the interlocking block along a first axis and disposed on a first of the plurality of sides;
    a second bore hole extending throughout the length of the interlocking block along a second axis and disposed on a second of the plurality of sides; and
    a third bore hole extending throughout the length of the interlocking block along a third axis and disposed on a third of the plurality of sides; and
    a bore hole insert having a diameter smaller than a diameter of at least one of the first bore hole, the second bore hole and the third bore hole,
    wherein the at least one male interlocking member is sized to receive a corresponding object female interlocking member of an object for display,
    wherein the at least one female interlocking member is sized to receive a corresponding object male interlocking member of the object for display.

13. The interlocking block mounting apparatus of claim 12, wherein the first bore hole, the second bore hole and the third bore hole intersect at the substantial center of the interlockable block.

14. The interlocking block mounting apparatus of claim 12, further comprising a cap corresponding to an opening of one of the first bore hole, the second bore hole and the third bore hole.

15. The interlocking block mounting apparatus of claim 12, wherein the interlockable block is a rectangular cube.

16. The interlocking block mounting apparatus of claim 12, wherein the first side, the second side and the third side are constructed of plastic.

17. The interlocking block mounting apparatus of claim 12, further comprising a peg sized according to the length and diameter of at least one of the first, second and third bore holes.

18. The interlocking block mounting apparatus of claim 17, further comprising a fastener end disposed at an end of the peg.

19. The interlocking block mounting apparatus of claim 12, wherein the bore hole is sized according to one of a round cylinder, an oval cylinder, a rectangular cylinder, and an irregularly shaped cylinder.

20. The interlocking block mounting apparatus of claim 12, wherein the at least one male interlocking member and the at least one female interlocking are disposed on one of the plurality of sides.

21. The interlocking block mounting apparatus of claim 12, wherein the at least one male interlocking member is disposed on a first of the plurality of sides and the at least one female interlocking is disposed on a second of the plurality of sides.

22. The interlocking block mounting apparatus of claim 12, wherein the at least one male interlocking member and the at least one female interlocking are disposed on the plurality of sides.

* * * * *